United States Patent
Gahmberg et al.

[19]

[11] Patent Number: 6,101,913
[45] Date of Patent: Aug. 15, 2000

[54] DEVICE FOR CUTTING MEAT

[76] Inventors: Charles E. C. Gahmberg; Tom J. C. Gahmberg, both of Gunnarsinrantatie 26, 10940 Hanko, Finland

[21] Appl. No.: 08/817,725

[22] PCT Filed: Oct. 24, 1995

[86] PCT No.: PCT/FI95/00587

§ 371 Date: Apr. 23, 1997

§ 102(e) Date: Apr. 23, 1997

[87] PCT Pub. No.: WO96/12411

PCT Pub. Date: May 2, 1996

[30] Foreign Application Priority Data

Oct. 24, 1994 [FI] Finland ..................................... 944995

[51] Int. Cl.[7] .............................. A22C 17/02; B26D 7/27
[52] U.S. Cl. ................................. 83/176; 83/19; 83/75.5; 83/77; 83/522.26; 83/620; 83/932
[58] Field of Search ........................... 83/19, 620, 762, 83/932, 17, 77, 176, 522.11, 522.26, 624, 631, 636, 14, 75.5, 76.1, 76.7, 761, 454, 466.1

[56] References Cited

U.S. PATENT DOCUMENTS

| | | | |
|---|---|---|---|
| 1,545,332 | 7/1925 | Kase | 83/176 X |
| 4,228,709 | 10/1980 | Guzay, Jr. et al. | 83/620 |
| 5,161,447 | 11/1992 | Emsens | 83/762 X |
| 5,499,578 | 3/1996 | Payne | 83/932 X |
| 5,662,033 | 9/1997 | Yawman | 83/932 X |
| 5,680,803 | 10/1997 | Vizurraga et al. | 83/932 X |

FOREIGN PATENT DOCUMENTS

| | | | |
|---|---|---|---|
| 164806 | 8/1992 | Denmark . | |
| 113637 | 7/1984 | European Pat. Off. . | |
| 306012 | 3/1989 | European Pat. Off. . | |
| 620682 | 4/1927 | France . | |
| 3314762 | 10/1984 | Germany . | |
| 4215527 | 11/1993 | Germany . | |
| 1-193194 | 8/1989 | Japan | 83/77 |
| 56331 | 3/1936 | Norway . | |

*Primary Examiner*—Clark F. Dexter
*Attorney, Agent, or Firm*—Klauber & Jackson

[57] ABSTRACT

The present invention relates to a method for cutting a piece of meat into a predetermined number of steaks. To allow the piece of meat to be cut in a rapid and simple manner with small losses of raw material, the piece of meat is placed in a mould whose bottom, cover and side walls substantially enclose the piece of meat, the piece of meat is subjected to a pressure in such a way that the bottom, the cover or at least one of the walls is movable and at least partly pressed into the mould until the piece of meat is so compressed as to fill substantially the entire space between the bottom, side walls and cover of the mould. The cutting elements are inserted into the mould through slots provided in the side walls, cover and/or bottom of the mould, whereby the piece of meat subjected to pressure is cut into a predetermined number of steaks by the cutting elements. The invention also relates to a cutting apparatus.

5 Claims, 2 Drawing Sheets

DEVICE FOR CUTTING MEAT

SUMMARY OF THE INVENTION

The invention relates to a method for cutting a piece of meat into a predetermined number of steaks, said method comprising placing the piece of meat in a mould the bottom, cover and walls of which substantially enclose the piece of meat, and inserting cutting elements into the mould through slots provided in the walls, cover and/or bottom of the mould, whereby the piece of meat is cut into a predetermined number of steaks by means of said cutting elements. The invention also relates to an apparatus for cutting a piece of meat into steaks of constant predetermined weight, said apparatus comprising a mould for receiving the piece of meat, said mould comprising a substantially rectangular bottom, from which side walls project, the longitudinal side walls being provided with slots having regular intervals and extending from the bottom of the mould to the upper edge of the side walls, a movable cover, movable cutting elements arranged to be inserted into the mould substantially perpendicularly to the longitudinal axis of the mould through the slots provided in the longitudinal walls for cutting the piece of meat.

The present invention relates to the cutting of meat and particularly to problems associated with cutting a piece of meat into steaks of equal size and predetermined weight. Conventionally steaks have been cut manually from a larger piece of meat, wherefore the size of the steaks has been mainly dependent on the experience and estimate of the person cutting the meat. After being cut, the steaks have been weighed, and strips of meat have been removed from the steaks that have been too heavy, and strips of meat have been pressed against the surface of the steaks that have been too light to make them attach thereto.

In practice, the cutting method described above has proved to be far too inaccurate and slow. The manual cutting method has also entailed significant losses of raw material. This is mainly due to the fact that after the cutting the steaks have been usually somewhat too heavy, since in practice it is very difficult to increase the weight of the steaks afterwards. The weight of supplied steaks has therefore often exceeded the intended weight, which has led to losses of raw material if the pricing has been based on the number of supplied steaks. Even in cases where the size of the steaks that have been too heavy has been reduced before they have been supplied to the customer, there have been significant losses. The main reason for this is that the price of the strips of meat obtained in this way is lower per kilogramme than the price of steaks.

The object of the present invention is to solve the problems described above and to provide a method which allows a piece of meat to be cut rapidly and simply into a predetermined number of steaks. This is achieved with a method according to the present invention, which is characterized in that at least one of the walls of the mould is a removable plate which is selectively inserted into the mould through said slots for adjusting the length of the mould, and before the cutting elements are inserted into the mould, the piece of meat is subjected to pressure in such a way that the bottom, the cover or at least one of the walls is movable and at least partly pressed into the mould until the piece of meat is so compressed as to fill substantially the entire space between the bottom, walls and cover of the mould.

The invention is based on the idea of significantly simplifying and expediting the cutting of a piece of meat into a predetermined number of steaks by at first compressing the piece of meat in a mould until it has a predetermined shape, and thereafter cutting the moulded piece of meat by inserting knives into the mould through slots provided in its cover, side walls or bottom. The number of steaks obtained from a piece of meat thus depends on the design of the mould, i.e. the number of slots provided in the mould, instead of the estimate made by the person cutting the meat. Providing the slots at regular, predetermined intervals also allows the size of the steaks to be determined in advance with great accuracy. The cutting method is also clearly more rapid than the known methods, since instead of a single knife, it is possible to utilize a plurality of parallel knives which are simultaneously inserted into the mould through the slots. The piece of meat is thus simultaneously cut into a plurality of steaks.

The invention further relates to an apparatus for cutting a piece of meat rapidly and accurately into steaks with constant, predetermined weight. This is achieved with an apparatus of the present invention, which is characterized in that it further comprises at least one movable transverse wall consisting of a movable plate which can be selectively positioned in one of said slots for adjusting the length of the mould, scales for weighing the piece of meat, indicator means responsive to said scales, said means, in response to the weight of the piece of meat, indicating the slot in the mould in which the movable transverse wall is to be placed, the movable cover being arranged to be pressed at least partly into the mould for pressing the piece of meat towards the bottom of the mould before the movable cutting elements are inserted into the mould so that the piece of meat is compressed and fills substantially the entire space between the bottom, longitudinal walls, transverse walls and cover.

BRIEF DESCRIPTION OF THE DRAWINGS

In the following, the invention will be described in greater detail by means of a preferred embodiment and with reference to the accompanying drawings, in which.

DESCRIPTION OF THE PREFERRED EMBODIMENT(S)

With reference to the drawings for purposes of illustration, the preferred embodiments of the method and apparatus according to the present invention are as follows in greater detail.

Figure 1:
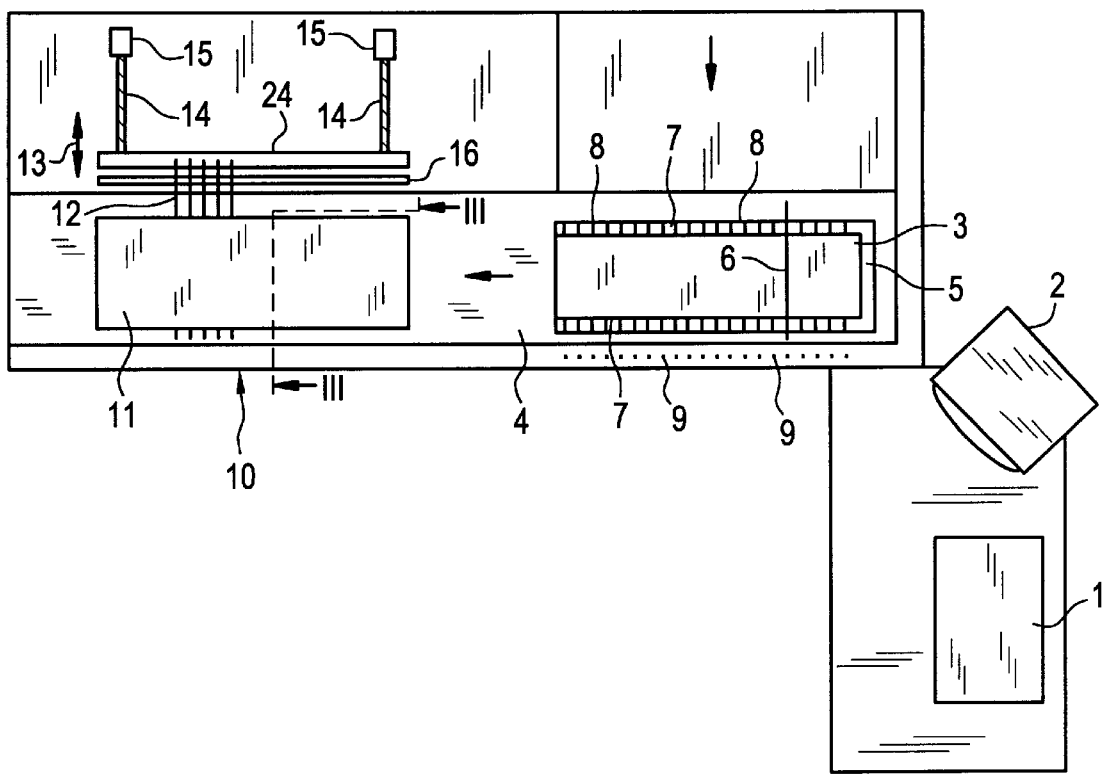
FIG. 1 is a top view of an apparatus of the present invention.
Figure 5:
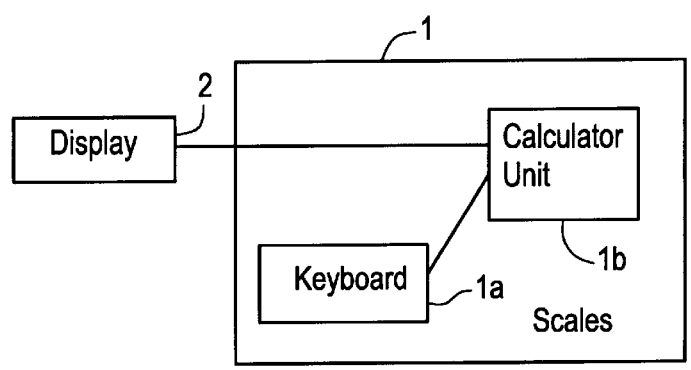
FIG. 5 shows a functional block diagram of the scales and display according to the present invention.

FIG. 1 is a top view of an apparatus of the present invention. The apparatus comprises scales 1 for weighing the pieces of meat to be cut. With reference to FIGS. 1 and 5, the scales 1 comprise a keyboard 1a by means of which the user can enter the predetermined weight that the steaks should have, e.g. 120 g. Thereafter the user places the piece of meat on the scales 1. The scales 1 comprise a calculator unit 1b, which calculates the number of steaks of 120 g that can be obtained from the piece of meat placed on the scales 1, and also the weight of the surplus meat. The term 'surplus meat' is used herein to refer to the amount of meat exceeding the sum of the weight of the steaks into which the meat is to be cut. If the piece of meat weighs e.g. 700 g, it is possible to cut it into five steaks of 120 g, whereafter the weight of the surplus meat will be 700−5×120=100 g.

A display 2 is connected to the scales 1 for indicating the weight of the surplus meat. The user can thus cut out strips from the piece of meat until all surplus meat has been removed.

A mould 3 has been placed in advance in a predetermined position on a conveyor 4. The mould 3, whose bottom is substantially rectangular when viewed from the top, comprises two longitudinal walls 7 and a fixed transverse wall 5. The other transverse wall 6 consists of a movable plate which can be passed into the mould through a selected slot 9 in the longitudinal walls 7 of the mould 3. The length of the part of the mould in which the piece of meat is placed depends on where the user places the movable transverse wall 6. In FIG. 1, the movable transverse wall 6 has been passed into the mould through one of the slots B in the mould 3. The longitudinal and transverse walls of the mould project substantially perpendicularly from the bottom of the mould 3.

The calculator unit 1b of the scales 1 is connected to indicator means, which in FIG. 1 comprise a number of light diodes 9 mounted along the edge of the conveyor 4 in such a way that one light diode 9 is provided in front of each slot 8. When the calculator unit 1b has calculated that the piece of meat is to be cut into five steaks, the fifth light diode 9 from the right in FIG. 1 is switched on. This indicates to the user that the movable transverse wall 6 must be passed through the fifth slot of the mould 3 from the left (according to an alternative embodiment, the light diodes can be replaced with numbers, whereby the indicator means indicate on the display 2 the number of the slot in which the movable transverse wall 6 is to be positioned). When the movable transverse wall is in its place, the user puts the piece of meat in the mould 3 (between the fixed transverse wall 5 and the movable transverse wall 6). Thereafter the user presses a start button, as a result of which the conveyor 4 starts moving, taking the mould 3 towards the left in FIG. 1, to a cutting device 10.

Figure 3:
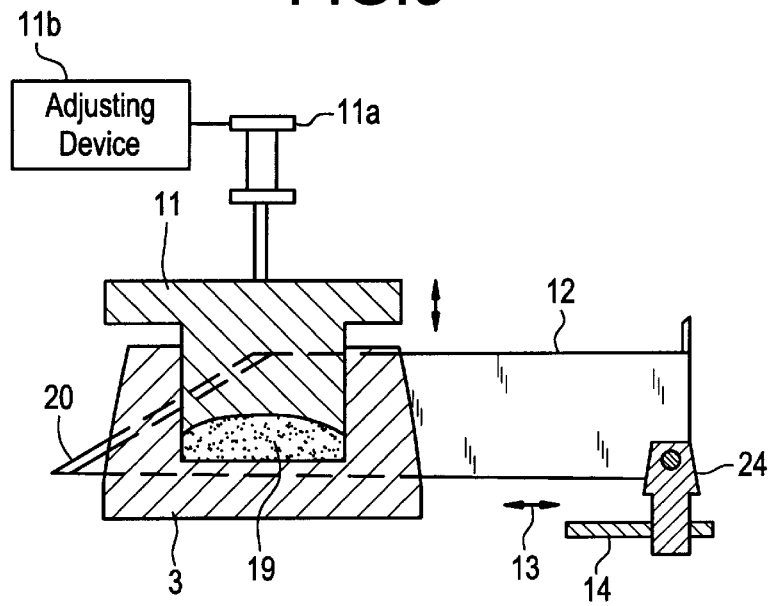
FIG. 3 shows a cross-section of a mould of FIG. 1.

FIG. 1 shows a second mould, which is at the cutting device 10. The cutting device comprises a mobile cover 11 which is lowered from above to close the mould (FIG. 3). The actuators of the cover, which can comprise e.g. ball screws, pneumatic or hydraulic cylinders, are, for purposes of illustration, shown in FIGS. 3 and 4 as being of the pnuematic or hydraulic cylinder type. The actuators of the cover preferably comprise an adjusting device for adjusting the power with which the cover 11 is pressed against the piece of meat. In FIG. 1, the second mould is closed with the cover 11.

The cutting device comprises a plurality of parallel knives 12 the first ends of which are secured to a transverse beam 24 and which are arranged to move in the direction indicated by arrows 13 by means of screws 14 and electric motors 15. For reasons of clarity, FIG. 1 shows only five knives 12, although the number of knives is in fact much higher (there should be a knife per each slot in the mould). When the mould 3 has arrived at the cutting device 10, the cover 11 is at first lowered so that it is pressed at least partly into the mould 3 (FIG. 3). The piece of meat in the mould is thereby compressed so that it completely fills the space between the bottom, the cover 11 and side walls 5, 6 and 7 of the mould 3. The actuators of the cover 11 comprise an adjusting device for adjusting the force exerted on the piece of meat by the cover 11.

When the piece of meat has been compressed, the actuators 14 and 15 of the knives are activated. The knives 12 are thereby pushed into the mould 3 and the piece of meat through the slots 8 provided in the longitudinal walls 7 of the mould 3. In order to guide the knives 12, the apparatus shown in FIG. 1 comprises a guide cam 16 attached to the base. To compensate for the volume of the knives when they are pushed into the piece of meat, the cover 11 preferably moves slightly upwards at the same time as the knives are pushed in. The piece of meat is thus cut into steaks. FIG. 1 shows the knives 12 in a position where they have passed into the mould through slots 8 in one of the longitudinal walls 7 of the mould 8 so that their points stick out of the mould through slots 8 in the opposite longitudinal wall 7. Thereafter the actuators 14 and 15 withdraw the knives from the mould.

Once the knives 12 have been withdrawn from the mould, the actuators of the cover 11 are activated, and the cover is lifted off the mould. Thereafter the conveyor 4 is activated in order to convey the mould 3 towards the left in FIG. 1. The steaks are taken out of the mould 3 either manually or preferably with an automatic emptying device, whereafter the movable transverse wall 6 is removed, and the mould is returned to its original position to the right of the cutting device 10.

When the cutting apparatus shown in FIG. 1 is combined with an automatic emptying device which empties the moulds and returns them to their original place (to the right of the cutting device 10), it is possible within approximately 25 seconds to fill a new mould, cut the contents of the mould into steaks, empty the mould and send it back. The time taken at the actual cutting device 10 is approximately 8 seconds. The number of steaks obtainable per a unit of time depends naturally on the length of the mould, the number of knives, and the original size of the piece of meat. In any case, the number of steaks cut is, of course, much higher than if a manual cutting method were employed.

Figure 2:
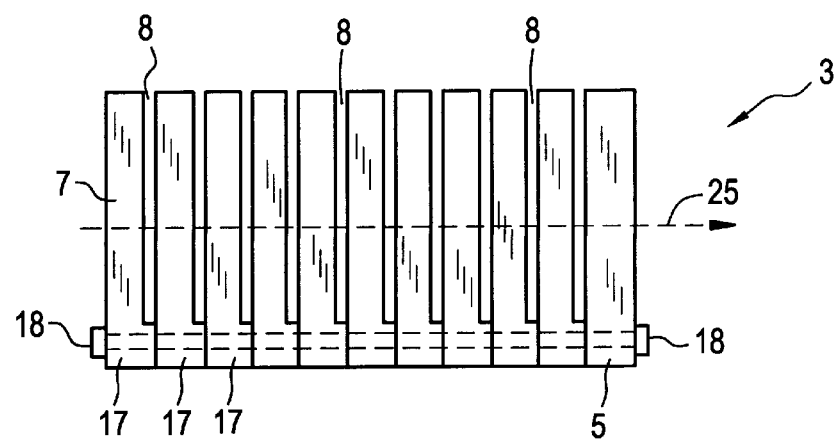
FIG. 2 shows a mould of FIG. 1.

FIG. 2 shows the mould 3 of FIG. 1. FIG. 2 illustrates one of the longitudinal walls 7 of the mould. The mould 3 shown in FIG. 2 comprises a plurality of plastic elements 17 held together by a screw 18 which is substantially parallel to the longitudinal axis 25 of the mould. The elements are shaped in such a way that slots 8 are formed between them, said slots being sufficiently large to allow knives to be inserted into the mould through them. The width of the elements 17 thus determines the thickness of the steaks obtained with that mould. The element 5 farthest on the right in FIG. 2 does not comprise a slot, because it constitutes the fixed transverse wall 5 of the mould 3. The mould can naturally also be manufactured from a single integral piece in which slots are formed.

FIG. 3 shows a cross-section of a mould, taken along the line III—III of FIG. 1. It can be seen from FIG. 3 that the piece of meat 19 is compressed so that it takes up the entire volume of the mould. This is achieved in such a way that the cover 11 is pressed into the mould 3. In addition, FIG. 3 shows one of the knives 12 with which the piece of meat 19 is cut. It can be seen from FIG. 3 that the knife 12 has been inserted into the mould through one of the slots provided in the cover 11 and the mould 3 in such a way that its point 20 cuts the meat 19 into steaks.

Figure 4:
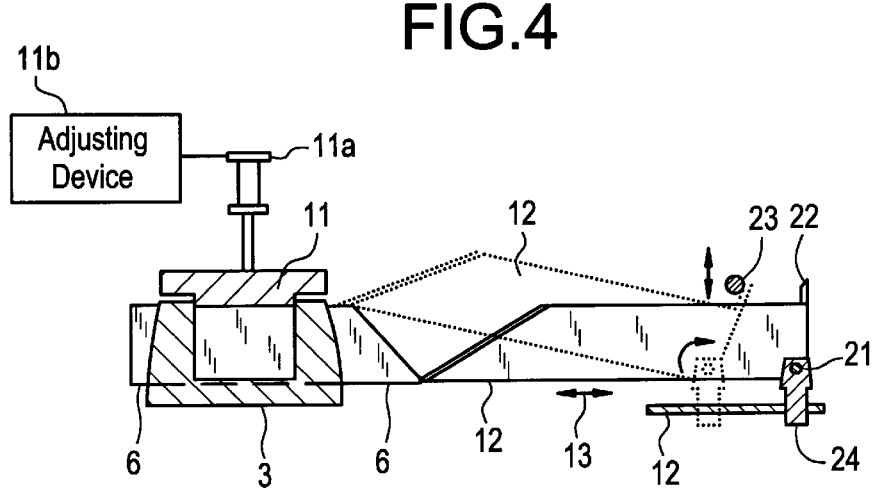
FIG. 4 shows a cross-section of a mould of FIG. 1.

FIG. 4 shows a cross-section of the mould of FIG. 1. In FIG. 4 the mould 3 is seen from the same direction as in FIG. 3. FIG. 4 illustrates the movable transverse wall 6, by means of which the length of the part of the mould 3 in which the piece of meat is placed is adjusted. It appears from FIG. 4 that the transverse wall 6 is bevelled at the end facing the knives 12. Thus, when one of the knives 12 hits the transverse wall 6, it turns upwards round its axle 21, by means of which it is pivotedly connected to the transverse beam 24.

FIG. 4 shows a knife 12 which moves towards the left in two different positions. In the first position (farthest on the right), the point of the knife 12 hits the transverse wall 6. In the second position (broken lines), the knife 12 has turned upwards, as its point follows the bevel of the transverse wall 6. At this stage, a bar 23 parallel to the mould 3 and positioned horizontally above the knives is lowered, whereby it hits a projection 22 provided on the knife 12, as a result of which the knife 12 further turns round the axle 21 until its point is above the cover 11. In other words, no knife is inserted through the slot 8 in which the movable transverse wall 6 is positioned; instead, the knife which would otherwise have been inserted through this slot turns upwards until its point is above the cover 11 of the mould 3.

It should be observed that the above description and the figures are intended merely to illustrate a preferred embodiment of the invention. It should therefore be noted that, for instance, the number of knives and/or the shape of the mould can differ from the embodiment described above. The embodiments of the present invention are thus limited only by the appended claims.

We claim:

1. An apparatus for cutting a piece of meat into steaks of constant predetermined weight, said apparatus comprising:

a mould for receiving the piece of meat, said mould having a substantially rectangular bottom, from which longitudinal and transverse side walls project, said longitudinal side walls being provided with slots having regular intervals and extending from said bottom of the mould to an upper edge of the longitudinal side walls;

a movable cover removably received within said mould;

movable cutting elements substantially aligned with said slots to be inserted into said mould substantially perpendicular to a longitudinal axis of said mould through said slots provided in said longitudinal side walls for cutting the piece of meat;

wherein at least one of said transverse walls is a movable plate which is removably and selectively positioned in one of said slots for adjusting an effective length of the mould, scales for weighing said piece of meat and for determining said slot in said mould in which said movable transverse wall is to be placed;

indicator means responsively connected to said scales, said means, in response to said scales, indicating said slot in said mould in which said movable transverse wall is to be placed, means for pressing said movable cover at least partly into said mould for pressing said piece of meat towards said bottom of said mould before said movable cutting elements are inserted into said mould so that said piece of meat is compressed and fills substantially said entire space between said bottom, longitudinal side walls, transverse side walls and cover.

2. An apparatus according to claim 1, wherein said scales comprise a calculator unit which on the basis of said weight of said piece of meat and said predetermined weight of said steaks calculates the number of steaks into which said piece of meat is to be cut and a weight of surplus meat, said apparatus further comprising a display connected to said scales, wherein said display is responsive to said calculator unit and indicates said weight of said surplus meat.

3. An apparatus according to claim 2, wherein said indicator means comprises light diodes which, responsive to said calculator indicate the slot located where said movable is to be positioned to allow said piece of meat to be cut correct number of steaks in such a way that one of said light diodes is located in ent with said slot is switched on.

4. An apparatus according to claim 1, wherein said means for pressing includes actuators operatively connected to said movable cover, an adjusting device for adjusting a force exerted by said cover on piece of meat in said mould.

5. An apparatus according to claim 1, wherein said movable cutting elements include a plurality of parallel knives each having a first end secured to a common actuator and each having a second end for penetrating into the mould through said slots; and said common actuator being adapted to move said knives in a longitudinal direction toward said mould. cover.

* * * * *